Sept. 30, 1958

G. THIRUP 2,854,629

DEVICE FOR MEASURING ELECTRIC POWER

Filed Feb. 5, 1954

INVENTOR
GUNNAR THIRUP

BY

AGENT

United States Patent Office 2,854,629
Patented Sept. 30, 1958

2,854,629

DEVICE FOR MEASURING ELECTRIC POWER

Gunnar Thirup, Eindhoven, Netherlands, assignor, by mesne assignments, to North American Philips Company, Inc., New York, N. Y., a corporation of Delaware Application February 5, 1954, Serial No. 408,536

Claims priority, application Netherlands February 20, 1953

6 Claims. (Cl. 324—99)

The invention relates to devices for measuring electric power, more particularly at high frequencies, in which use is made of a self-oscillating bolometer circuit.

Devices comprising a bolometer for measuring electric power are known, in which the bolometer resistor having a high negative or positive temperature coefficient is included in a Wheatstone bridge in a diagonal, the current source of which can be put into circuit and which is in equilibrium under normal conditions. The supply of the high-frequency energy to the resistor having a high temperature coefficient brings the bridge out of equilibrium. Provision is made of means to restore the equilibrium by reducing the supply of energy to the diagonal of the bridge and of means to measure the variation of the low-frequency energy supplied through the bridge to the bolometer resistor and constituting a measure for the high-frequency energy supplied to the resistor. The bridge may be fed by direct current or alternating current.

Use has been made of self-oscillating devices of this kind, comprising a bolometer; in this case the supply of energy directly from an additional alternating current source may be dispensed with. Use may be made in this case of an amplifier, the input circuit of which is connected to one of the bridge diagonals and the output circuit of which feeds the alternating current produced to the bridge in the other diagonal.

In order that the invention may be readily carried into effect, it will now be described with reference to the accompanying drawing, in which.

Figure 1:
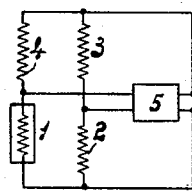
Fig. 1 shows such a device.

Referring to Fig. 1, reference numeral 1 designates a resistor having a high positive or negative temperature coefficient and housed or not housed in an envelope. It constitutes a branch of a Wheatstone bridge, the other branches of which are constituted by ohmic resistors 2, 3 and 4, which are substantially not sensitive to temperature. One diagonal of the bridge is connected to the input circuit of an amplifier 5, the output voltage of which is operative between the other diagonal points. At a definite temperature for example, room temperature, the bridge is substantially in equilibrium. The bridge constitutes a feed-back path from the output circuit to the input circuit of the amplifier 5. It may be assumed that the bridge is slightly out of equilibrium, so that the feed-back is positive and oscillations are produced in the amplifier, their frequency being determined primarily by feed-back elements, for example, inductors and capacitors, provided in the amplifier. Owing to the oscillation produced, a certain amount of current passes through the resistor 1, so that it assumes a higher or lower value than at room temperature. The construction is such that the current tends to restore the bridge equilibrium, so that the amplitude of the oscillations produced is stabilized at a substantially constant value.

If energy for example high-frequency energy, is supplied to the resistor 1 from without, the constantly present slight disturbance of equilibrium of the bridge will be further reduced, so that also the fed-back voltage decreases. The amplitude of the oscillations produced thus decreases to such an extent that the temperature of the resistor 1 is again substantially equal to the initial temperature. It may be assumed that in this case the energy which is dissipated in the resistor 1 and which is constituted by the heat generated by the current flowing through the resistor and by the high-frequency energy supplied from without, is constant. Consequently the decrease in amplitude of the oscillation produced, the frequency of which is chosen, in general, to be relatively low, is a measure for the high-frequency energy supplied from without. This energy may, for example, be measured by means of a meter 7, which is connected to the output amplifier 5 via an amplifier 6, which may be combined with a rectifier.

Figure 2:
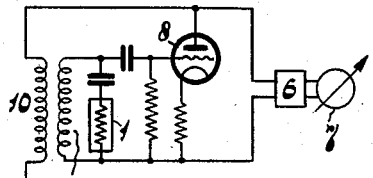
Fig. 2 is a schematic diagram illustrating a different embodiment of the device shown in Fig. 1.

Fig. 2 shows a variation of the system shown in Fig. 1, in which variation the resistor having a positive or negative temperature coefficient is included in an oscillatory circuit 9, connected between the control-grid and the cathode of an amplifying tube 8. Through the feed-back coil 10, which is included in the anode circuit, energy is fed back to the circuit 9, so that oscillations are produced, the amplitude of which is stabilized by the resistor 1. In this case the resistor 1 may be connected in parellel with the circuit; then a resistor having a negative temperature coefficient must be employed. The circuit arrangement operates otherwise similarly to that shown in Fig. 1, i. e. if high-frequency energy is supplied to the resistor 1, a disturbance of the equilibrium is initially produced. More particularly, the ohmic value of resistor 1 decreases and thereby the resistor increases the loading of the oscillator circuit. Consequently the amplitude of the oscillations produced decreases to such an extent that a stable condition is regained. It may be assumed that the sum of the high-frequency energy and the low-frequency energy in the resistor 1 is constant under stable conditions.

The circuits described above have a limitation in that if the high-frequency power increases, the deflection of the low-frequency voltmeter 7 decreases. The invention has for its object to obviate this disadvantage. In accordance with the present invention, in a device as described above, the circuit has derived from it a voltage which decreases if the power to be measured increases and that this voltage is used as an input voltage for a second bolometer circuit, from which is derived a voltage serving as a measure for the energy supplied to the first bolometer resistor.

The output voltage of the first bolometer circuit may be supplied, subsequent to amplification if desired, directly to the second bolometer resistor included in the feed-back circuit of a second amplifier. A more advantageous solution is obtained, if use is made of a single amplifier and if the two bolometer circuits are caused to oscillate with different frequencies, the oscillations of the two frequencies being amplified in the said amplifier. This arrangement has the advantage not only of an economy in amplifying tubes, but also of greater independence of the indication of variations in mutual conductance of the tubes during operation; the properties of the arrangement remaining substantially unchanged if the tubes are replaced by others having slightly different properties.

Figure 3:
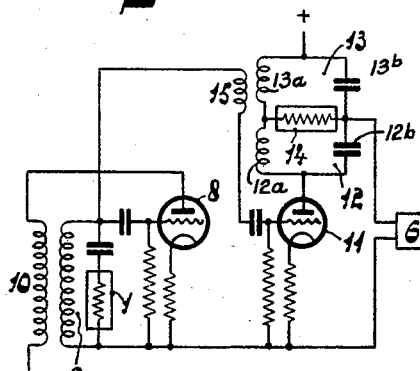
Fig. 3 is a schematic diagram illustrating a first embodiment of a circuit according to the invention.

Fig. 3 shows a first embodiment of a circuit according to the invention, in which corresponding parts are designated by the same reference numerals as those of Fig.

2. The resistor 1 is connected in a manner similar to that shown in Fig. 2. It is assumed that the circuit 9 is tuned to a comparatively low frequency, for example 20,000 c./s. The voltage occurring at one of the electrodes, in this case, the grid of the amplifier 8 is supplied through a coupling coil 15 to the control-grid of a second tube 11, the anode circuit of which comprises two circuits 12 and 13. The circuit 12 comprises the inductor 12a and capacitor 12b and is tuned to the frequency of 20,000 c./s. The circuit 13 comprises the inductor 13a and capacitor 13b and is tuned to a different frequency, for example, 2,000 c./s. The latter circuit is coupled with the coil 15. A second resistor 14, having a positive temperature coefficient, is connected in common to the two circuits 12 and 13.

In this arrangement, the oscillations appearing across the circuit 9 are amplified by the tube 11 and appear across the circuit 12 thereby energizing the resistor 14 at the frequency of the oscillator 8, i. e. at 20/kc./sec. In addition to serving as an amplifier for the 20 kc./sec. oscillations, the tube 11 also serves as an oscillator tube for a 2 kc./sec. signal which is generated by the tube 11 and by the feedback coupling between the winding 15 and the winding 13a of the circuit 13 which is tuned to 2 kc./sec. According as the high-frequency energy supplied to the resistor 1 is higher, the energy set free in the resistor 14 is lower. Consequently, in the event of an increase in high-frequency energy to be measured, the damping of the circuit 13 will decrease, so that the voltage across this circuit, having the second frequency, decreases. This voltage may be measured by means of an amplifier 6 and a measuring instrument 7.

Figure 4:
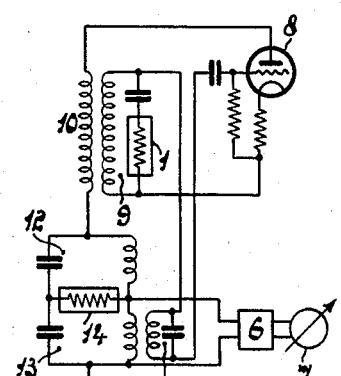
Fig. 4 is a schematic diagram illustrating a second embodiment in accordance with the invention.

A second embodiment is shown in Fig. 4. The arrangement shown in Fig. 4 differs from that shown in Fig. 2 in that a single amplifier 8 is used for the two frequencies produced. For this purpose a circuit 16, tuned to the second frequency, and coupled with the circuit 13, also tuned to this frequency, is included in the grid circuit of the tube 8.

Figure 5:
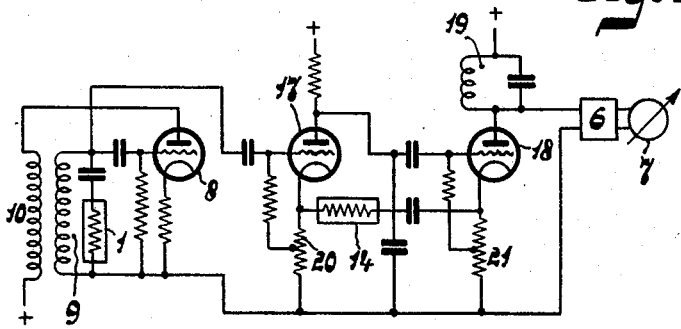
Fig. 5 is a schematic diagram illustrating a further embodiment of the invention.

In the embodiment shown in Fig. 5 use is made of an RC-oscillator, comprising two tubes 17 and 18, the anode of the first tube being connected to the grid of the second tube, provision being furthermore made of a junction between the cathodes, constituted by the series combination of a second bolometer resistor 14 and a capacitor. Since the cathodes are connected through resistors 20 and 21 to the negative terminal of the current supply, an oscillator is formed, the amplitude of the oscillations produced being stabilized by the resistor 14. The grid circuit of the tube 17 includes the first bolometer circuit, corresponding to that shown in Fig. 2. The arrangement operates as follows:

If it is assumed that the first bolometer circuit does not produce a voltage of the frequency $f_1$, the RC-circuit oscillates at a frequency $f_2$ with a definite bolometer power. If the first oscillator supplies energy of the frequency $f_1$, the voltage of the frequency $f_2$ decreases, since also in this case the total power dissipated in the bolometer resistor must remain constant, in order that the oscillation condition of the RC-circuit should be fulfilled. From the circuit 19 tuned to the second frequency is now derived a voltage, which may be supplied, subsequent to amplification, to the measuring instrument.

Frequently a zero indication of the measuring instrument is desired, i. e. an indication zero or substantially zero in case no high-frequency energy is supplied. The arrangement according to the invention permits of readily obtaining this indication, if, for example simultaneously with the low-frequency alternating current a direct current is passed through the first bolometer resistor. The direct current is varied until the deflection of the voltmeter serving as a measuring instrument is very small.

A positive deflection has a great advantage in that the value of the effective high-frequency voltage at the first bolometer may be read from a conventional low-frequency voltmeter. Thus a very sensitive, directly readable thermic voltmeter which may be used up to many thousand kc./s. is obtained.

What is claimed is:

1. A device for measuring power comprising a first bolometer resistor member exhibiting variations in resistance value as determined by variations of said electrical power applied thereto, a first oscillation generating circuit including said resistor member for producing a first oscillation having an intensity as determined by the effective resistance value of said resistor member, a second bolometer resistor member, a second oscillation generating circuit including said second resistor member for producing a second oscillation having an intensity as determined by the effective resistance value of said second resistor member, means for applying said first oscillation to said second resistor member thereby to vary the effective resistance of said second resistor member as determined by the intensity of said first oscillation, and means for measuring the intensity of said second oscillation.

2. A device for measuring power comprising a first bolometer resistor member exhibiting variations in resistance value as determined by variations of said electrical power applied thereto, a first oscillation generating circuit including said resistor member and a feedback amplifier system for producing a first oscillation having an intensity as determined by the effective resistance value of said resistor member, a second bolometer resistor member, a second oscillation generating circuit including said second resistor member and a second feedback amplifier system for producing a second oscillation having an intensity as determined by the effective resistance value of said second resistor member, means for applying said first oscillation to said second resistor member thereby to vary the effective resistance of said second resistor member as determined by the intensity of said first oscillation, and means for measuring the intensity of said second oscillation.

3. A device for measuring power comprising a first bolometer resistor member exhibiting variations in resistance value as determined by variations of electrical power applied thereto, a first oscillation generating circuit including said resistor member and a feedback amplifier system for producing a first oscillation having an intensity as determined by the effective resistance value of said resistor member, said first feedback amplifier system comprising a first frequency discriminating network producing in said system an oscillation having a first given frequency value, a second bolometer resistor member, a second oscillation generating circuit including said second resistor member and a second feedback amplifier system for producing a second oscillation having an intensity as determined by the effective resistance value of said second resistor member, said second feedback amplifier system comprising a second frequency discriminating network producing in said second system an oscillation having a second given frequency value lower than said first frequency value, means for applying said first oscillation to said second resistor member thereby to vary the effective resistance of said second resistor member as determined by the intensity of said first oscillation, and means for measuring the intensity of said second oscillation.

4. A device for measuring power comprising a first bolometer resistor member exhibiting variations in resistance value as determined by variations of electrical power applied thereto, a first oscillation generating circuit including said resistor member and a feedback amplifier system for producing a first oscillation having an intensity as determined by the effective resistance value of said resistor member, said first feedback amplifier system comprising an electron discharge device having input and output electrodes, inductive means coupling said electrodes in regenerative feedback relationship and capacitive means coupled to said inductive means and producing therewith a first tuned circuit resonating at a first given frequency value, a second bolometer resistor member, a second oscillation generating circuit including said second resistor member and a second feedback amplifier system for producing a second oscillation having an intensity as determined by the effective resistance value of said second resistor member, said second feedback amplifier system comprising an electron discharge device having input and output electrodes, inductive means coupling said electrodes in regenerative feedback relationship and capacitive means coupled to said inductive means and producing therewith a second tuned circuit resonating at a second given frequency value lower than said first given frequency value, means for applying said first oscillation to said second resistor member thereby to vary the effective resistance of said second resistor member as determined by the intensity of said first oscillation, and means for measuring the intensity of said second oscillation.

5. A device for measuring power comprising a first bolometer resistor member exhibiting variations in resistance value as determined by variations of electrical power applied thereto, a first oscillation generating circuit including said resistor member and a feedback amplifier system for producing a first oscillation having an intensity as determined by the effective resistance value of said resistor member, said first feedback amplifier system comprising an electron discharge device having input and output electrodes, inductive means coupling said electrodes in regenerative feedback relationship and capacitive means coupled to said inductive means and producing therewith a first tuned circuit resonating at a first given frequency value, a second bolometer resistor member, a second oscillation generating circuit including said second resistor member and a second feedback amplifier system for producing a second oscillation having an intensity as determined by the effective resistance value of said second resistor member, said second feedback amplifier system comprising said electron discharge device, second inductive means coupling the said electrodes in regenerative feedback relationship and second capacitive means coupled to said second inductive means and producing therewith a second tuned circuit resonating at a second given frequency value lower than said first given frequency value, means for applying said first oscillation to said second resistor member thereby to vary the effective resistance of said second resistor member as determined by the intensity of said first oscillation, and means for measuring the intensity of said second oscillation.

6. A device for measuring power comprising a first bolometer resistor member exhibiting variations in resistance value as determined by variations of electrical power applied thereto, a first oscillation generating circuit including said resistor member and a feedback amplifier system for producing a first oscillation having an intensity as determined by the effective resistance value of said resistor member, said first feedback amplifier system comprising an electron discharge device having input and output electrodes, inductive means coupling said electrodes in regenerative feedback relationship and capacitive means coupled to said inductive means and producing therewith a first tuned circuit resonating at a first given frequency value, a second bolometer resistor member, a second oscillation generating circuit including said second resistor member and a second feedback amplifier system for producing a second oscillation having an intensity as determined by the effective resistance value of said second resistor member, said second feedback amplifier system comprising an electron discharge system having input and output electrodes and a resistance-capacitance circuit coupling said electrodes in regenerative feedback relationship thereby to produce an oscillatory circuit having a resonant frequency different from said first frequency value, means for applying said first oscillation to said second resistor member thereby to vary the effective resistance of said second resistor member as determined by the intensity of said first oscillation, and means for measuring the intensity of said second oscillation.

References Cited in the file of this patent
UNITED STATES PATENTS

| | | |
|---|---|---|
| 2,449,072 | Houghton | Sept. 14, 1948 |
| 2,617,843 | Houghton | Nov. 11, 1952 |